SIGNAL LIMITING APPARATUS
Filed May 11, 1967
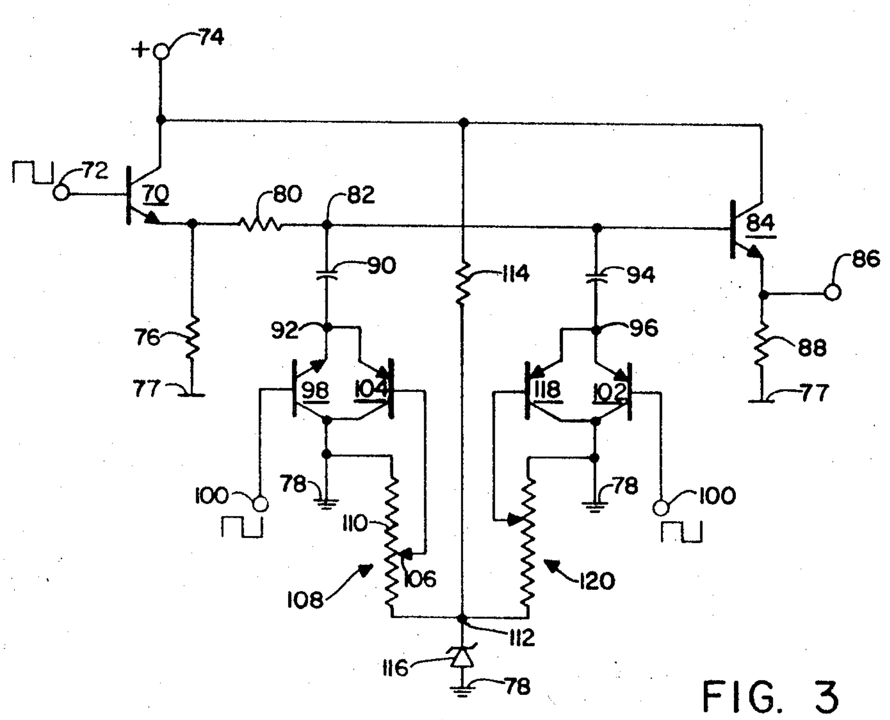
FIG. 3
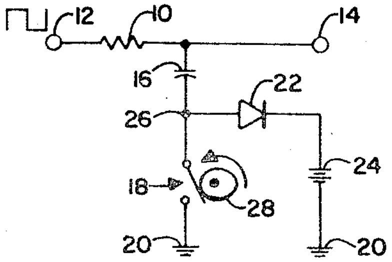
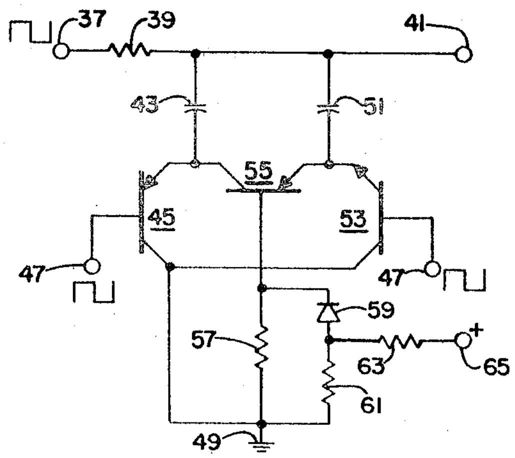
FIG. 1
FIG. 2
INVENTOR.
ADRIAN J. MOSES
BY Bruce C. Lutz
ATTORNEY United States Patent Office 3,465,171
Patented Sept. 2, 1969

3,465,171
SIGNAL LIMITING APPARATUS

Adrian J. Moses, Rush City, Minn., assignor to Honeywell Inc., Minneapolis, Minn., a corporation of Delaware Filed May 11, 1967, Ser. No. 637,827
Int. Cl. H03k 5/08, 17/00
U.S. Cl. 307—237 8 Claims

ABSTRACT OF THE DISCLOSURE

A low level limiting circuit utilizing a capacitor and switch connected across a signal source to be limited comprising in addition a unidirectional current control means such as a diode connected from a junction between the switch and the capacitor to a voltage reference level which sets the peak voltage of the input signal which is applied to the output. A pair of these units can be combined if switched at opposite polarities of the input signals so as to provide a unit which will be operable for either phase input signal.

THE INVENTION

The present invention is applicable generally to electronic circuitry and more particularly to signal limiting circuits.

Prior art devices have been generally limited to good performance at high limiting levels or to complex circuits if low level limiting is desired. Double anode Zener diodes can normally be used to provide very simple amplitude limiting if the signal to be limited is more than approximately 10 or 12 volts. At voltages less than this, double anode Zener diodes having relatively tight voltage tolerances become quite expensive to buy and further do not have sharp knees or voltage limiting levels. In other words, changes in input voltage will provide fairly extensive changes in output voltage due to the extreme changes in current through the Zener diode and the resultant voltage increase due to its internal resistance. In general, other voltage limiting circuits have tended to be quite complex with the exception of a copending application, entitled "Control Apparatus" filed on Apr. 11, 1967, with a serial number of 630,048, which contains a circuit that will provide voltage limiting with high accuracy down to approximately 6 volts. However, even this circuit will not provide as low a level limiting as is provided by the present invention.

In operation, the present invention utilizes a capacitor and switch in series across, a signal source. The switch is operated such that it will turn to an ON condition on alternate half cycles. The alternate ON periods allow the capacitor to be charged toward the peak voltage of the incoming signal. In addition, a unidirectional diode is connected to a junction point between the capacitor and the switch and also is connected at the other end to a reference voltage source. Thus, on the half cycle when the switch is OFF, the capacitor voltage plus the peak voltage of the input signal is applied through the unidirectional current means to the battery or voltage source. If the combined voltages are greater than the voltage source, the capacitor will discharge into the voltage source and thus maintain a peak-to-peak voltage of the input signal at an approximately constant level. If two of these units are used with the switches turning to an ON condition on alternate successive half cycles, the unit will provide even greater accuracy. It will also produce increased flexibility since it will be operable for either phase input signal.

It is therefore an object of this invention to provide improved low level limiter circuitry.

Other advantages and objects of this invention will be apparent from a reading of the specification and appended claims in conjunction with the drawings in which:

FIGURE 1 is a basic embodiment of the invention;

FIGURE 2 is a preferred embodiment of the invention wherein the limiting is to be symmetrical; and FIGURE 3 is an embodiment of the invention wherein it is desired to have unsymmetrical limiting for one phase input signal as compared to the opposite phase input signal.

In FIGURE 1 a resistor 10 is situated between an input terminal 12 and an output terminal 14. A capacitor 16 is connected in series with a switch generally designated as 18 between output terminal 14 and ground or reference potential 20. A diode 22 is connected in series with a battery or reference voltage source 24 between ground 20 and a junction point 26 which is situated between the series connections of the capacitor 16 and the switch 18. As shown, the switch 18 is operated by an off-center cam 28 which closes switch 18 for 180 electrical degrees of the input signal and is in synchronism therewith that the 180° closure of the switch occurs simultaneously with the negative half cycle portions of the input signal shown at input 12.

In FIGURE 2 an input terminal 37 is connected to one end of a resistor 39 which has its other end connected to an output 41. A capacitor 43 is connected between output 41 and an emitter of a switch means or PNP transistor 45 which has its base connected to a source of input signal 47 and a collector connected to ground 49. A capacitor 51 is connected between output 41 and an emitter of switch means or NPN transistor 53 which has its base connected to a signal source 47 and a collector connected to the collector of transistor 45. A PNP transistor 55 has an emitter connected to the emitter of transistor 53 and a collector connected to the emitter of transistor 45. A resistance 57 is connected between a base of transistor 55 and ground or other reference potential 49. A diode 59 and a resistor 61 are connected in series and the combination is connected in parallel with resistor 57. A resistor 63 is connected between a positive potential source 65 and a junction point between diode 59 and resistor 61. The diode 59 is connected such that its direction of current flow is toward the base of transistor 55 or in other words, its cathode is connected directly to the base of transistor 55. As will be realized by those skilled in the art, diode 59 can easily be replaced by a sensitor for temperature compensation purposes. As will be noted, the input signal applied to the bases of transistors 45 and 53 are of the same phase and as will be explained later in the specification, if a source of opposite phase switching signals is present, both transistors 45 and 53 could be of the same polarity type.

In FIGURE 3 a NPN transistor generally designated as 70 has a base connected to a signal input 72, a collector connected to a source of positive potential 74 and an emitter connected to one end of a resistor 76 which has its other end connected to negative reference potential 77. A resistor 80 is connected between the emitter of transistor 70 and a junction point 82 which is further connected to a base of a NPN transistor generally designated as 84. A collector of transistor 84 is connected to terminal 74 while an emitter thereof is connected to an output terminal 86. A resistor 88 is connected between terminal 86 and terminal 77. A capacitor 90 is connected between junction point 82 and a junction point 92. Another capacitor 94 is connected between junction point 82 and a junction point 96. A switch means or NPN transistor generally designated as 98 has an emitter connected to junction point 92 and a collector connected to ground or reference potential 78 while a base thereof is connected to a source of switching signals 100. A switch means or PNP transistor generally designated as 102 has its emitter connected to junction point 96, its collector connected to ground 78 and its base connected to the source of switching signals 100. A PNP transistor or unidirectional current control means 104 has an emitter connected to junction point 92 and a collector connected to ground 78 while a base thereof is connected to a wiper 106 of a potentiometer generally designated as 108 having a resistance element 110 connected between ground 78 and a junction point 112. A resistor 114 is connected between power source 74 and junction point 112. A Zener diode 116 is connected between junction 112 and ground 78 such that there is a voltage drop across the Zener diode. In other words, the cathode of Zener diode 116 is connected directly to junction point 112. A PNP transistor or unidirectional current control means 118 has an emitter connected to junction point 96 and a collector connected to ground 78 while a base thereof is connected to a wiper of a potentiometer generally designated as 120. A resistance element of potentiometer 120 is connected between ground 78 and junction point 112.

As will be realized, the switch 18 is interchangeable with the switches 45, 53, 98 and 102 and may be also replaced by many other types of switching means. Further, the diode 22 is interchangeable with the transistors 102 and 104 and may be variously termed unidirectional current control means or unidirectional reference voltage source means. As will be realized, other voltage source control means may be used than what is shown specifically in the preferred embodiments of the drawings. The capacitors are energy storage means and may in some instances be replaced by other energy storing means such as variable capacitance diodes, etc. The resistance means are also replaceable by other types of impedance means in some embodiments of the invention.

OPERATION

In explaining the operation of FIGURE 1 it will be assumed that switch 18 closes the contact to ground during the negative half cycle of the input signal. In this condition, the capacitor will charge such that the plate connected to output 14 is negative with respect to the other electrode. On the positive half cycle the switch 18 will open and if the peak of the positive half cycle voltage plus the voltage across capacitor 16 exceeds the voltage of battery 24, diode 22 will allow discharge of the capacitor into battery 24 so as to lower the voltage of the capacitor 16. On the negative half cycle, the capacitor will again receive a charge and on the succeeding positive half cycle the capacitor will again dump part of its charge. As will be realized, the invention will not work if the R-C time constant is so small that the capacitor can charge up in one cycle or less. For use as a limiter a somewhat optimum time constant has been found to be eight cycles. Of course, the circuit can be used as a lag circuit if the time constant is made considerably longer than eight cycles.

Further, as will be realized, if the above operation were altered such that the switch 18 closed only during the positive half cycle, the limiter action would not work.

In view of the similarity of FIGURE 1 to FIGURE 3, FIGURE 3 will now be described before FIGURE 2. With the signals shown applied to terminals 72 and 100, it will be realized that capacitor 90 will have the plate or electrode connected to junction point 82 charged positive with respect to that electrode connected to junction point 92 while capacitor 94 will have the electrode connected to 82 charged negative with respect to the electrode connected to junction point 96. This occurs because transistor 98 turns ON for the positive half cycle of the input signal while transistor 102 turns ON during the negative half cycle of the input signal. After several cycles, the capacitors will each charge to approximately one half the voltage of the setting of the wiper on potentiometer 120. When this occurs, the peak voltage of the input signal plus the voltage across capacitor 94 will forward bias transistor 118 and allow a discharge current through the emitter-collector circuit of transistor 118 to ground 78 and also through the transistor emitter-base connection to ground 78 through the resistance element of potentiometer 120.

If the phase of the input signal reverses, then capacitor 90 will discharge through the transistor 104 to ground 78 since this capacitor will now charge on each negative half cycle rather than on the positive half cycle.

While at first glance, it would seem that the capacitor 90 can charge to the full positive peak voltage of the input signal since only capacitor 94 is being discharged, this is not the case. Since it takes several cycles to charge capacitor 90 to its full potential, there is a voltage dividing action between capacitors 90 and 94 when the voltage thereacross becomes great enough to turn ON transistor 118. Thus, the voltage across each of the capacitors remains at approximately one half of the voltage set by either potentiometer 108 or 120 and thus determines the peak of the alternating potentials received by output transistor 84 and thus at output terminal 86.

As is realized by those skilled in the art, transistor 70 is merely an emitter follower for the purpose of providing the signal through the isolating resistor 80 to the limiting circuit and the Zener diode 116 is merely for the purpose of providing a reference voltage source to the limiting portion of the circuit. As will be further realized, if the wipers of potentiometers 108 and 120 are set at different values, the limiting action of the limiting circuit will be of a different amplitude for different phase input signals.

In FIGURE 2, a circuit is shown which will provide equal limiting for either polarity input signal. As similarly shown before, an input signal is applied to input terminal 37 and is provided in its limited version at output 41. On the positive half cycle, with the polarities of the signals shown at terminals 37 and 47, capacitor 51 will charge such that the electrode connected to terminal 41 is positive with respect to the other electrode. The capacitor 43 will charge such that its electrode connected to terminal 41 is negative with respect to the other electrode. After several cycles of application of the input signal, the peak voltage plus the voltage across capacitor 43 will cause transistor 55 to break down and provide a partial short circuit between the electrodes of the capacitors 43 and 51 which are connected to the emitters of transistors 45 and 53. Thus, the capacitors will charge or discharge as the case may be into each other to equalize the respective voltages thereacross.

To be more specific, on the positive half cycle, the transistor 53 is ON and thus connected to ground while transistor 45 is OFF. The peak voltage of the input signal which is contained across capacitor 51 plus the voltage of capacitor 43 may be high enough to turn ON transistor 55. When this occurs, current will flow from capacitor 43 through the collector-emitter circuit of transistor 55 and to ground through transistor 53. Alternatively, it may be explained that capacitor 43 is discharging to capacitor 51. The voltage at which limiting occurs is set by the resistors 57, 61 and 63 in conjunction with diode 59.

The circuit shown is accurate enough under temperature extremes for most conditions of circuit use in view of the temperature compensation provided by diode 59. However, if resistor 61 is replaced by a temperature sensitive resistor, practically all temperature sensitive voltage variations of transistor 55 can be compensated for such that it will always switch the same voltage applied to either the collector or emitter.

As will be realized by those skilled in the art, the switching transistors in the FIGURES 2 and 3 are chopping type transistors and are utilized because of the low emitter to collector voltage in the ON condition. As is known, these transistors may be replaced by FET's if opposite phase switching signals are used. In the configuration shown, the collector is used as an emitter. Further, transistor 55 is used in a similar fashion and either the collector or emitter may be used as an emitter when the proper potentials with respect to the base are applied.

As previously implied, all the transistors in the circuit may be of the same polarity type if opposite phase signals are applied to the switching transistors.

In view of the above comments, it will be realized that there are many embodiments of the circuit other than the few circuits shown in this application and I wish to be limited not by the scope of the preferred embodiment shown but only by the scope of the appended claims in which I claim:

1. Signal amplitude limiting apparatus comprising in combination:

input means including ground means, for receiving a signal of a given frequency to be limited;

output means including ground means, for supplying a limited output signal;

signal isolation means connected between said input means and said output means;

energy storage means;

switch means operating at the given frequency and in synchronism therewith so that it is ON for a first 180 electrical degrees;

means connecting said energy storage means and said switch means in series between said signal isolation means and ground, said last named means including a junction between said switch means and said energy storage means;

reference means for supplying a voltage to set a predetermined amplitude at which signal limiting will occur; and unidirectional current control means connected between said junction and said reference means, said current control means allowing discharge of said energy storage means when the sum of the signal to be limited and the signal stored in said energy storage means exceeds the predetermined amplitude.

2. Apparatus as claimed in claim 1 wherein said energy storage means is a capacitor; and said current control means is a semiconductor device which permits current flow therethrough only during said next 180 electrical degrees.

3. Apparatus as claimed in claim 1 wherein said energy storage means comprises at least first and second units; and said switch means connects the first unit to ground only during the first 180 electrical degrees and connects the second unit to ground only during the next 180 electrical degrees.

4. Apparatus as claimed in claim 3 wherein the current control means is a transistor having the emitter thereof connected to one unit, the collector thereof connected to the other unit, and the base thereof connected to the reference means.

5. Apparatus as claimed in claim 3 wherein said reference means supplies first and second voltage which may be individually varied; and said current control means comprises at least two means for allowing discharge of said first and second units at different predetermined amplitudes of the signal to be limited in accordance with the phase thereof.

6. Apparatus for amplitude limiting a signal comprising, in combination:

means for supplying an alternating input signal of first and second polarities to be limited;

means for supplying the amplitude limited signals as an output;

means for substantially isolating the signal source from the effects of signal limiting connected between said first and second means;

first and second energy storage means connected to said second named means;

switch means alternately connecting said first and second energy storage means for charging during the occurrence of the first and second polarities respectively of said input signal; and means, including a unidirectional current control means and a source of reference potential means, connected to said first and second energy storage means for partially discharging said energy storage means through said current control means when the sum of any voltages across said energy storage means exceeds the potential of said source of reference potential.

7. Apparatus as claimed in claim 6 wherein said energy storage means are capacitors.

8. Apparatus as claimed in claim 7 wherein said current control means is a transistor with the base thereof connected to said source of reference potential and the emitter connected to one of said capacitors.

References Cited

UNITED STATES PATENTS

| | | | |
|---|---|---|---|
| 2,863,123 | 12/1958 | Koch | 307—237 XR |
| 3,052,857 | 9/1962 | Martin | 328—166 XR |
| 3,069,618 | 12/1962 | Pfaff | 307—237 XR |
| 3,348,157 | 10/1967 | Sullivan et al. | |

JOHN S. HEYMAN, Primary Examiner

JOHN ZAZWORSKY, Assistant Examiner

U.S. Cl. X.R.

328—171, 173; 307—264, 246